US010255791B2

(12) United States Patent
Wilkinson et al.

(10) Patent No.: US 10,255,791 B2
(45) Date of Patent: Apr. 9, 2019

(54) APPARATUS AND METHOD FOR PROVIDING REMINDERS

(71) Applicant: Walmart Apollo, LLC, Bentonville, AR (US)

(72) Inventors: Bruce W. Wilkinson, Rogers, AR (US); Todd D. Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/783,624

(22) Filed: Oct. 13, 2017

(65) Prior Publication Data

US 2018/0108242 A1    Apr. 19, 2018

Related U.S. Application Data

(60) Provisional application No. 62/408,286, filed on Oct. 14, 2016.

(51) Int. Cl.
*H04W 24/00* (2009.01)
*G08B 21/24* (2006.01)
(Continued)

(52) U.S. Cl.
CPC ............ *G08B 21/24* (2013.01); *H04W 4/029* (2018.02); *H04W 4/40* (2018.02)

(58) Field of Classification Search
CPC ................. G08B 21/24; H04W 4/029
(Continued)

(56) References Cited

U.S. PATENT DOCUMENTS 4,675,656 A    6/1987 Narcisse
5,652,569 A    7/1997 Gerstenberger
(Continued)

FOREIGN PATENT DOCUMENTS

FR    2854464    11/2004
WO    2006067463    6/2006
WO    2015150846    10/2015

OTHER PUBLICATIONS

PCT; App. No. PCT/US2017/056611; International Search Report and Written Opinion dated Dec. 28, 2017.

*Primary Examiner* — Marceau Milord
(74) *Attorney, Agent, or Firm* — Fitch, Even, Tabin & Flannery LLP

(57) ABSTRACT

Systems, apparatuses, and methods are provided herein for providing reminders. A system for providing reminders comprises a communication device configured to receive location information associated with at least a vehicle, a mobile device, and a tracker coupled to an item, a movement pattern database, and a control circuit. The control circuit being configured to: track a current movement pattern of the vehicle, the mobile device, and the tracker based on the location information received via the communication device, select an expected movement pattern from the movement pattern database based on the location information associated with one or more of the vehicle, the mobile device, and the tracker, compare the current movement pattern of the vehicle, the mobile device, and the tracker with the expected movement pattern, and generate an alert based on detecting a deviation from the expected movement pattern.

21 Claims, 4 Drawing Sheets

(51) Int. Cl.
*H04W 4/029* (2018.01)
*H04W 4/40* (2018.01)

(58) Field of Classification Search
USPC ........................................................ 455/456.1
See application file for complete search history.

(56) References Cited

U.S. PATENT DOCUMENTS

| | | | |
|---|---|---|---|
| 6,967,576 B2 | 11/2005 | Hayes | |
| 7,034,678 B2* | 4/2006 | Burkley | G01S 5/0027 |
| | | | 340/539.13 |
| 7,091,853 B2* | 8/2006 | Pfleging | H04L 12/2803 |
| | | | 340/12.32 |
| 7,245,216 B2* | 7/2007 | Burkley | H04W 4/90 |
| | | | 340/539.13 |
| 7,937,244 B2* | 5/2011 | Kadaba | G06K 19/0717 |
| | | | 340/572.1 |
| 8,314,704 B2* | 11/2012 | Cova | G06Q 10/0833 |
| | | | 340/568.1 |
| 8,334,773 B2* | 12/2012 | Cova | G06Q 10/0833 |
| | | | 340/572.1 |
| 8,432,274 B2* | 4/2013 | Cova | G01S 5/0027 |
| | | | 340/539.1 |
| 8,810,392 B1 | 8/2014 | Teller | |
| 8,872,655 B2 | 10/2014 | Buller | |
| 9,053,516 B2* | 6/2015 | Stempora | G06Q 40/08 |
| 9,516,470 B1* | 12/2016 | Scofield | H04W 4/21 |
| 9,805,601 B1* | 10/2017 | Fields | G08G 1/096791 |
| 9,998,864 B2* | 6/2018 | Kumar | H04W 4/029 |
| 2003/0135304 A1* | 7/2003 | Sroub | G06Q 10/08 |
| | | | 701/1 |
| 2006/0158329 A1* | 7/2006 | Burkley | H04W 4/90 |
| | | | 340/539.13 |
| 2011/0193710 A1 | 8/2011 | Mcilvain | |
| 2014/0036077 A1* | 2/2014 | Nerayoff | H04N 7/181 |
| | | | 348/148 |
| 2014/0309789 A1* | 10/2014 | Ricci | B60Q 1/00 |
| | | | 700/276 |
| 2014/0309870 A1* | 10/2014 | Ricci | H04W 4/21 |
| | | | 701/36 |
| 2014/0309927 A1* | 10/2014 | Ricci | B60Q 1/00 |
| | | | 701/424 |
| 2015/0025917 A1* | 1/2015 | Stempora | G06Q 40/08 |
| | | | 705/4 |
| 2015/0193996 A1 | 7/2015 | Van Wiemeersch | |
| 2015/0232065 A1* | 8/2015 | Ricci | B60R 25/01 |
| | | | 701/36 |
| 2015/0262435 A1* | 9/2015 | Delong | G07C 5/0816 |
| | | | 340/439 |
| 2015/0279195 A1 | 10/2015 | Qian | |
| 2015/0382263 A1* | 12/2015 | Jain | H04W 76/10 |
| | | | 455/432.1 |
| 2016/0148440 A1 | 5/2016 | Kwak | |
| 2016/0205238 A1* | 7/2016 | Abramson | G01C 21/3484 |
| | | | 455/456.4 |
| 2017/0146801 A1* | 5/2017 | Stempora | G02B 27/0172 |
| 2017/0279957 A1* | 9/2017 | Abramson et al. | H04M 1/72577 |
| 2018/0032997 A1* | 2/2018 | Gordon | G06Q 20/3224 |

\* cited by examiner

APPARATUS AND METHOD FOR PROVIDING REMINDERS

CROSS-REFERENCE TO RELATED APPLICATION

This application claims the benefit of the following U.S. Provisional Application No. 62/408,286 filed Oct. 14, 2016, which is incorporated herein by reference in its entirety.

TECHNICAL FIELD

This invention relates generally to reminder systems.

BACKGROUND

Vehicles are used to transport various items. Grocery items that require refrigeration can become spoiled if they are left in a vehicle unintentionally for an extended period of time.

BRIEF DESCRIPTION OF THE DRAWINGS

Disclosed herein are embodiments of apparatuses and methods for providing reminders. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for providing reminders. A system for providing reminders comprises a communication device configured to receive location information associated with at least a vehicle, a mobile device, and a tracker coupled to an item, a movement pattern database, and a control circuit coupled to the communication device and the movement pattern database. The control circuit being configured to: track a current movement pattern of the vehicle, the mobile device, and the tracker based on the location information received via the communication device, select an expected movement pattern from the movement pattern database based on the location information associated with one or more of the vehicle, the mobile device, and the tracker, compare the current movement pattern of the vehicle, the mobile device, and the tracker with the expected movement pattern, and generate an alert based on detecting a deviation from the expected movement pattern.

Figure 1:
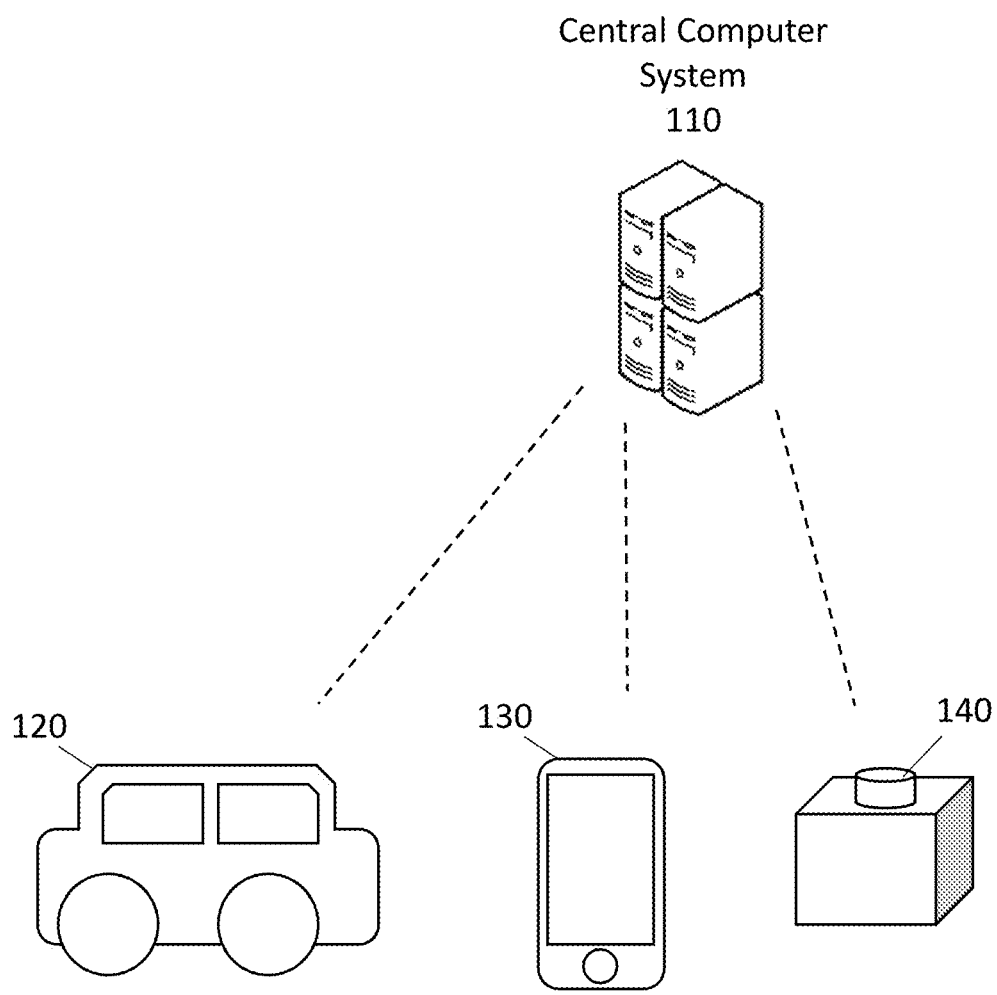
FIG. 1 is a system diagram of an overall system in accordance with several embodiments.

Referring now to FIG. 1, a system for providing reminders is shown. The system includes a central computer system 110 configured to communicate with a vehicle 120, a mobile device 130, and a tracker 140 coupled to an item 145. The central computer system 110 may comprise a control circuit, a central processing unit, a processor, a microprocessor and the like and may be one or more of a server, a central computing system, a cloud-based server, a personal computer system and the like. Generally, the central computer system 110 may comprise any processor-based device configured to communicate with a plurality of devices over a network. The central computer system 110 may include a processor configured to execute computer readable instructions stored on a computer readable storage memory. In some embodiments, the central computer system 110 may be configured to track the movement pattern of the vehicle 120, the mobile device 130, and the tracker 140 and generate an alert if the current movement pattern deviates from an expected movement pattern. In some embodiments, the central computer system 110 may be configured to communicate with one or more of the vehicle 120, the mobile device 130, and the tracker 140 via one or more of a mobile data network, a satellite data network, a Wi-Fi network, a cellular network, the Internet, and the like. In some embodiments, the central computer system 110 may perform one or more steps in the method described with reference to FIG. 2 herein. Further details of a central computer system 110 according to some embodiments is provided with reference to FIG. 3 herein.

Figure 2:
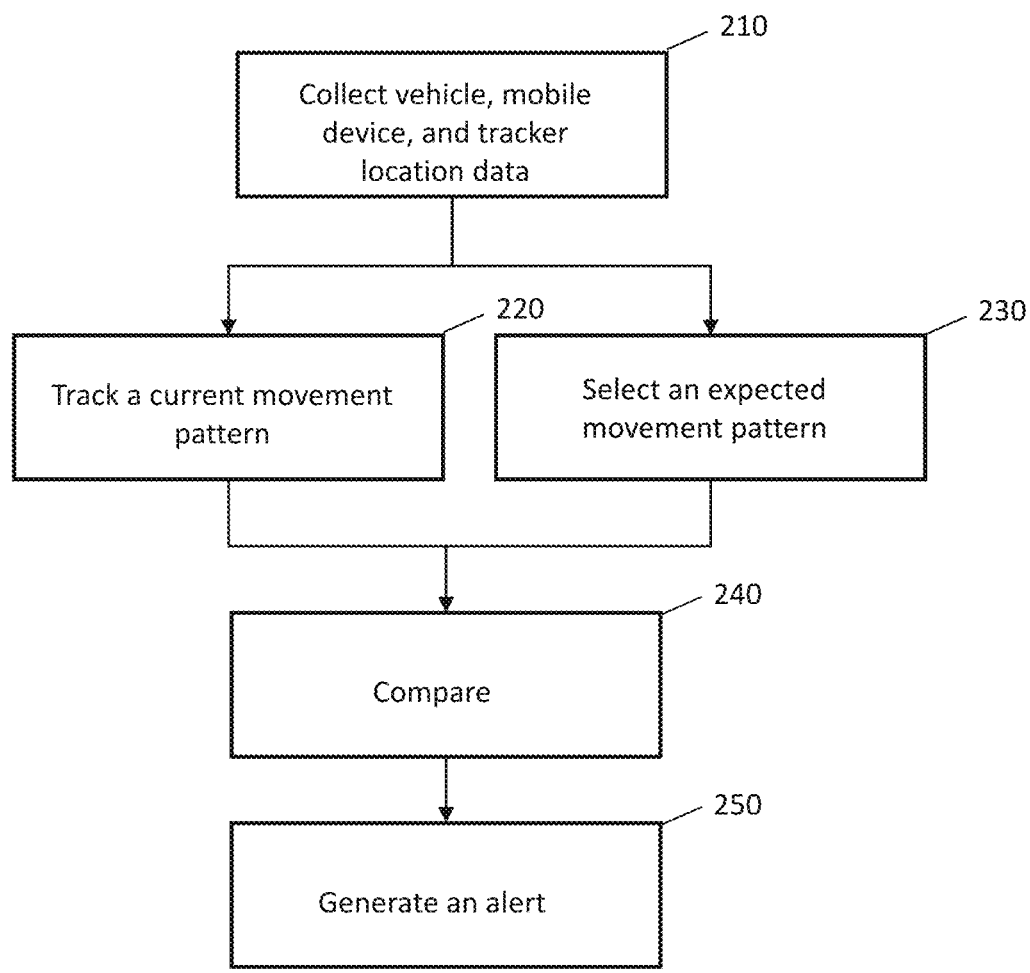
FIG. 2 is a flow diagram of a method in accordance with several embodiments.

The vehicle 120 may comprise a transport configured to carry humans and/or items to and from various destinations. In some embodiments, the vehicle 120 may comprise a manned or unmanned passenger and/or cargo vehicle. While an automobile is shown in FIG. 2, the vehicle 120 may comprise any type of vehicle such as motorcycles, bicycles, scooters, trucks, vans, buses, boats, and the like. In some embodiments, the vehicle 120 may comprise a location sensor such as a Global Positioning System (GPS) sensor, a mobile data transceiver, a cellular network transceiver, a Wi-Fi transceiver, an inertial measurement unit (IMU) etc. configured to detect a location of the vehicle 120. In some embodiments, the vehicle 120 may comprise a communication device configured to communicate with the central computer system 110 via a wireless network. In some embodiments, the vehicle 120 may comprise a short range sensor configured to detect for the presence and/or proximity of the mobile device 130 and/or the tracker 140. In some embodiments, one or more of the location sensor, the short range sensor, and communication device may comprise native/built-in components of the vehicle 120 and/or a separate device placed in or attached to the vehicle. In some embodiments, the vehicle 120 may be configured to provide an audio and/or visual alert based on messages received from the central computer system. In some embodiments, the audio and/or visual alert may be provided via the displays and/or speakers of the vehicle 120.

The mobile device 130 may comprise a portable processor-based device configured to be carried by a user. While a touch-screen type mobile phone is shown in FIG. 1, in some embodiments, the mobile device 130 may comprise one or more of a mobile phone, a smartphone, a tablet device, a watch, a head mounted display, a wearable device, a key fob, and the like. In some embodiments, the mobile device may comprise a location sensor such as a Global Positioning System (GPS) sensor, a mobile data transceiver, a cellular network transceiver, a Wi-Fi transceiver, etc. configured to detect a location of the mobile device 130 and transmit the location to the central computer system 110. In some embodiments, the mobile device 130 may comprise a short range sensor configured to detect for the presence and/or proximity of the vehicle 120 and/or the tracker 140. In some embodiments, the short range sensor may comprise one or more of a Bluetooth transceiver, a Wi-Fi transceiver, a Radio Frequency Identification (RFID) reader, and the like. In some embodiments, the mobile device 130 may comprise a communication device configured to communicate with the central computer system 110 via a wireless network. In some embodiments, the mobile device 130 may comprise user interface devices such as a display screen, a speaker, a touch screen, one or more buttons, a microphone, a light emitting diode (LED) light, and the like. In some embodiments, the mobile device 130 may be configured to provide an alert based on messages received from the central computer system 110. In some embodiments, the mobile device 130 may be configured run a mobile application for the reminder service that provides the alerts. In some embodiments, the mobile application may further allow the user to enroll in the service, configure user settings for the reminders, and/or register vehicles, mobile devices, and/or trackers to their user account.

The tracker 140 may comprise a portable device configured to couple to an item 145 such as a container, a tote, a bag, a box, and the like. Generally the tracker 145 may be coupled to any type of item with a permanent, semi-permanent, or removable coupler such as an adhesive, a clip, a hook, a ring, a hook and loop fastener, and the like. In some embodiments, the tracker may be configured to be carried by a human. For example, the tracker may be attached to clothing items or worn as a wristband. In some embodiments, the tracker may comprise a second mobile device. In some embodiments, the tracker may comprise a location sensor such as a Global Positioning System (GPS) sensor, a mobile data transceiver, a cellular network transceiver, a Wi-Fi transceiver, an IMU for performing dead reckoning, etc. and a communication device configured to transmit the location of the tracker 140 to one or more of the central computer system 110, the vehicle 120, and the mobile device 130. In some embodiments, the tracker 140 may comprise a radio frequency device configured to be detected by one or more remote devices such as a geofence sensor, a Bluetooth sensor, a Wi-Fi router, the vehicle 120, and/or the mobile device 130 in proximity of the tracker 140. In some embodiments, the tracker 140 may comprise a Radio Frequency identification (RFID) tag, a near field communication (NFC) tag, a passive transmitter, and the like. While FIG. 1 shows the tracker 140 communicating with the central computer system 110, in some embodiments, the location of tracker 140 may be provided to the central computer system 110 via one or more of a geofence sensor, a stationary transceiver (e.g. Wi-Fi router), a mobile device 130, and a vehicle 120. In some embodiments, the tracker may comprise a smart container holding one or more items and configured to communicate with one or more of the central computer system 110 and the vehicle 120. In some embodiments, the tracker may further comprise a content sensor for detecting the identity of an item and/or the content of a container coupled to the tracker. In some embodiments, the content sensor may comprise one or more of a RFID reader, a barcode sensor, a camera, and a temperature sensor. The size and shape of the tracker 140 in FIG. 1 is an illustration only. A tracker may comprise any size and shape without departing from the spirit of the present disclosure.

While one of each of the vehicle 120, the mobile device 130, and the tracker 140 are shown in FIG. 1, in some embodiments, the central computer system 110 may be configured to communicate with a plurality of vehicles, mobile devices, and tracker devices associated one or more users. In some embodiments, the central computer system 110 may further be configured to communication with presence and/or proximity sensing devices such as geofence sensors and Wi-Fi routers to receive location information and/or provide alerts.

Referring now to FIG. 2, a method of providing reminders is shown. In some embodiments, the steps shown in FIG. 2 may be performed by a processor-based device, such as a computer system, a server, a control circuit of a vehicle, a control circuit of a mobile device, a control circuit of a tracker device, and the like. In some embodiments, the steps in FIG. 2 may be performed by one or more of the central computer system 110 shown in FIG. 1, the control circuit 314, the control circuit 321, and/or the control circuit 331 described with reference to FIG. 3 herein or a similar device.

In step 210, the system collects location data from a vehicle, a mobile device, and a tracker. In some embodiments, prior to step 210, a user may first enroll in the reminder service through a mobile application, a website, a store kiosk etc. and register one or more vehicles, mobile devices, and trackers to include in the reminder service. In some embodiments, location information associated with one or more of the vehicle, the mobile device, and the tracker may be determine based one or more of a GPS sensor, a geofence sensor, a Wi-Fi transceiver, and mobile network transceiver on or near the vehicle, the mobile device, and/or the tracker. In some embodiments, one or more of the vehicle, the mobile device, and the tracker coupled to an item may be configured detect its location and transmit the location to the central computer system via a wireless network such as a mobile data network, a cellular network, a satellite network, a Wi-Fi network, the Internet, etc. with a wireless network transceiver. In some embodiments, the location data of one or more of the vehicle, the mobile device, and the tracker may be detected by a remote device such as a geofence sensor, a Wi-Fi router, a RFID reader, etc. that is configured to detect for the presence and/or proximity of the vehicle, the mobile device, and/or the tracker and transmit the location information to a central computer system. In some embodiments, the vehicle, the mobile device, and the tracker may comprise the vehicle 120, the mobile device 130, and the tracker 140 described with reference to FIG. 1 herein or similar devices. In some embodiments, one or more of the vehicle, the mobile device, and the tracker may be associated with a device identifier and a user profile. The system may associate tracked location data to a user based on device identifiers associated with the user's profile. For example, to enroll in the service, the user may add at least one vehicle, one mobile device, and one tracker to his/her profile. The system may then retrieve location information from one or more vehicles, mobile devices, and trackers associated with users who enrolled in the service and use the user's profile to generate the alert.

In step 220, the system tracks a current movement of the vehicle, the mobile device, and the tracker based on the location information received in step 220. In some embodiments, the movement pattern may comprise the locations of the vehicle, the mobile device, and the tracker over time. In some embodiments, the movement pattern may comprise distances between two or more of the vehicle, the mobile device, and the tracker over time. In some embodiments, the movement pattern may comprise distances between a location (e.g. user home, office, school, etc.) and one or more of the vehicle, the mobile device, and the tracker.

In step 230, the system selects an expected movement pattern based on the location information associated with one or more of the vehicle, the mobile device, and the tracker. In some embodiments, the expected movement pattern may be selected based on the locations of the vehicle or the mobile device alone. In some embodiments, expected movement patterns may be associated with different locations such as user home, a workplace, a school, a park, etc. In some embodiments, the expected movement pattern may be selected further based on one or more of a location type, a time of day, a day of the week, and a user demographic. For example, different expected movement patterns may be associated with the user's home in the morning on a weekday when the user typically leaves their home and in the evening when the user typically returns. In some embodiments, the expected movement patterns may be retrieved from a movement pattern database storing a plurality of expected movement patterns. In some embodiments, one or more movement patterns may be associated a specific user, a specific location, a group of users, a user demographic, a location type, etc. In some embodiments, movement patterns may be determined based on movement histories of the vehicle, the mobile device, and the tracker tracked over time. For example, the system may aggregate a plurality of movement patterns of a user over time and use the typical movement pattern associated with a location and/or time as the expected movement pattern for the user. In some embodiments, expected movement patterns may be determined based on movement patterns associated with a plurality of sets of vehicles, mobile devices, and trackers associated with different users. For example, the movement patterns of users at a home, at a school, at a workplace, etc. may be grouped to form an expected movement pattern for the location type. In some embodiments, location types may be determined based on map and/or zoning information (e.g. residence, office, store, park, etc.). In some embodiments, location type may be determined based on tracking users' locations over time. In some embodiments, movement patterns associated with users may be grouped based one or more of location type, time of day, day of the week, user location, user demographic, etc. to establish one or more expected movement patterns stored in the movement pattern database. In some embodiments, the expected movement pattern may comprise one or more expected locations for the vehicle, the mobile device, and the tracker. For example, an expected movement pattern associated with a home location in the evening may indicate that the mobile device and the tracker coupled to a grocery container should leave the vehicle together and enter into the house. In another example, the expected movement pattern associated with a school location in the afternoon may indicate that a tracker associated with a child's lunch box should travel away from the school location with the vehicle and the mobile device. In some embodiments, the system does not need to know what items are coupled to the tracker but may establish an expected movement pattern based on a history of movements of the item alone. In some embodiments, the system may be configured to determine an item type associated with the item coupled to the tracker based on tracking the movement pattern of the tracker over time. For example, if the tracker is observed to leave the vehicle at a school location, the system may identify the item coupled to the tracker as an item belonging to a child. In some embodiments, the system may then use the identity of the item to select expected movement patterns at different locations.

In step 240, the system compares the current movement pattern tracked in step 220 and the expected movement pattern selected in step 230. In some embodiments, the system may compare the expected and current locations of each of the vehicle, the mobile device, and the tracker. In some embodiments, the system may detect for the amount of deviation between the current movement pattern and the expected movement pattern. In some embodiments, the expected locations may comprise geographic zones and a deviation may be detected if the vehicle, the mobile device, and/or the tracker is outside of the expected zone for that item for an extended period of time (e.g. 2 minutes, 5 minutes, etc.). For example, if the expected movement pattern indicates that the vehicle and the tracker should stay in a zone associated with a parking area while the mobile device enters a zone associated with a workplace, a deviation may be detected if the mobile device stays in the parking area zone and/or if the tracker enters the office zone. In some embodiments, the movement pattern may comprise expected distances between one or more the vehicle, the mobile device, and the tracker, and a deviation may be detected if the distance is significantly below or above the expected distance. For example, if a tracker is expected to leave a vehicle and the mobile device is expected to stay near the vehicle at a location, a deviation may be detected if the tracker stays in proximity of the vehicle (e.g. under 5 feet, under 10 feet etc.) and/or if the mobile device leaves the vehicle (e.g. over 10 feet, over 20 feet etc.).

In step 250, the system generates an alert based on detecting a deviation from the expected movement pattern. In some embodiments, an alert may be generated after a deviation is present for a set period of time (e.g. 1 minute, 5 minutes, 10 minutes etc.). In some embodiments, when a deviation is detected, the system may determine whether to generate the alert based on user settings, a duration of the deviation, a current temperature, a current time, and an item type associated with the tracker, etc. In some embodiments, the system may select from a plurality of alert types based on one or more of: a duration of the deviation, a current temperature, a current time, and an item type associated with the tracker. In some embodiments, the alert may be provided to the user via one or more of the vehicle, the mobile device, and/or another user device such as a personal computer, a home appliance, a home alarm system, a smart appliance, etc. In some embodiments, the alert may comprise audio and/or visual indicators. In some embodiments, the alert may comprise a text message, a messaging service message, a mobile application notification, a pop-up notification, a ring tone, and the like. In some embodiments, a plurality of possible expected movement patterns may be selected in step 230 and an alert may be generated if the current movement pattern deviates from some of all of the expected movement patterns.

In some embodiments, the system may determine whether to generate the alert, select an alert type, and/or select the period of time before an alert is generated based on the item type of the item associated with the tracker. In some embodiments, the tracker may be coupled to a container and system may determine a content of the container based on one or more of a purchase record associated with the tracker and/or the mobile device and a content sensor coupled to the container. For example, the container may comprise a pickup order, a drive-up order, a store-to-trunk delivery order, etc. placed by the customer. The system may then use the order to determine what items are in the container. In some embodiments, the tracker may comprise a content sensor such as a RFID reader, a barcode scanner, a camera, a temperature sensor, etc. In some embodiments, the system may generate the alert based on whether a content of the container comprises one or more of: perishable items, refrigerated items, and frozen items. For example, if a container determined to be left in a vehicle unintentionally contains fresh produce, the system may send a reminder to the user after 5 minutes. However, if frozen items (e.g. ice cream) is left in the vehicle unintentionally, the system may send a reminder only after 2 minutes. In another example, a mobile application notification may be displayed for produce left in the vehicle while an audible alert may be made if frozen items are left in the vehicle. In some embodiments, the alert may be configured to accelerate over time. For example, the alert may become louder and/or more frequent as time passes.

In some embodiments, the alert is generated may further be based on whether the vehicle is powering a temperature control system for containing a temperature around the item. For example, the vehicle may be configured to detect for the presence of a container and use its own temperature control system and/or power a temperature regulator on the container to maintain the temperature of the interior of the container. The vehicle may communicate this information to the central computer system, and the system may generate a reminder alerting the user that the vehicle is using energy to perform temperature control for the container. In some embodiments, the vehicle may be configured to turn off the temperature control when its energy reserve (e.g. battery charge, fuel) falls below a threshold and/or after a set period of time. In some embodiments, the system may further be configured to alert the user that the temperature control provided by the vehicle is being turned off.

In some embodiments, after step 250, the alert may repeat continuously or periodically until the user turns off the alert with a user interface device or moves one or more of the vehicle, the mobile device, and the item coupled of the tracker to conform to the expected movement pattern. For example, if an alert is generated because a tracker coupled to a grocery container is left in a vehicle while a mobile device enters a home, the alert may be automatically turned off when the grocery container is retrieved from the vehicle and brought into the home. In some embodiments, the alert may be configured to escalate if the deviation persists. For example, the longer a grocery container containing frozen items is left in a car, the louder the audio alert may become.

In some embodiments, after step 250, the system may prompt the user to enter whether the alert was valid or was generated in error. For example, if a user meant to leave a tracker in the house, the user may use the user interface device to dismiss an alert and indicate that the alert was not correct. In some embodiments, the movement pattern tracked in step 220 and/or the user input may be used to add to and/or modify the expected movement pattern associated the location, time, and/or user associated with the current movement pattern.

Figure 3:
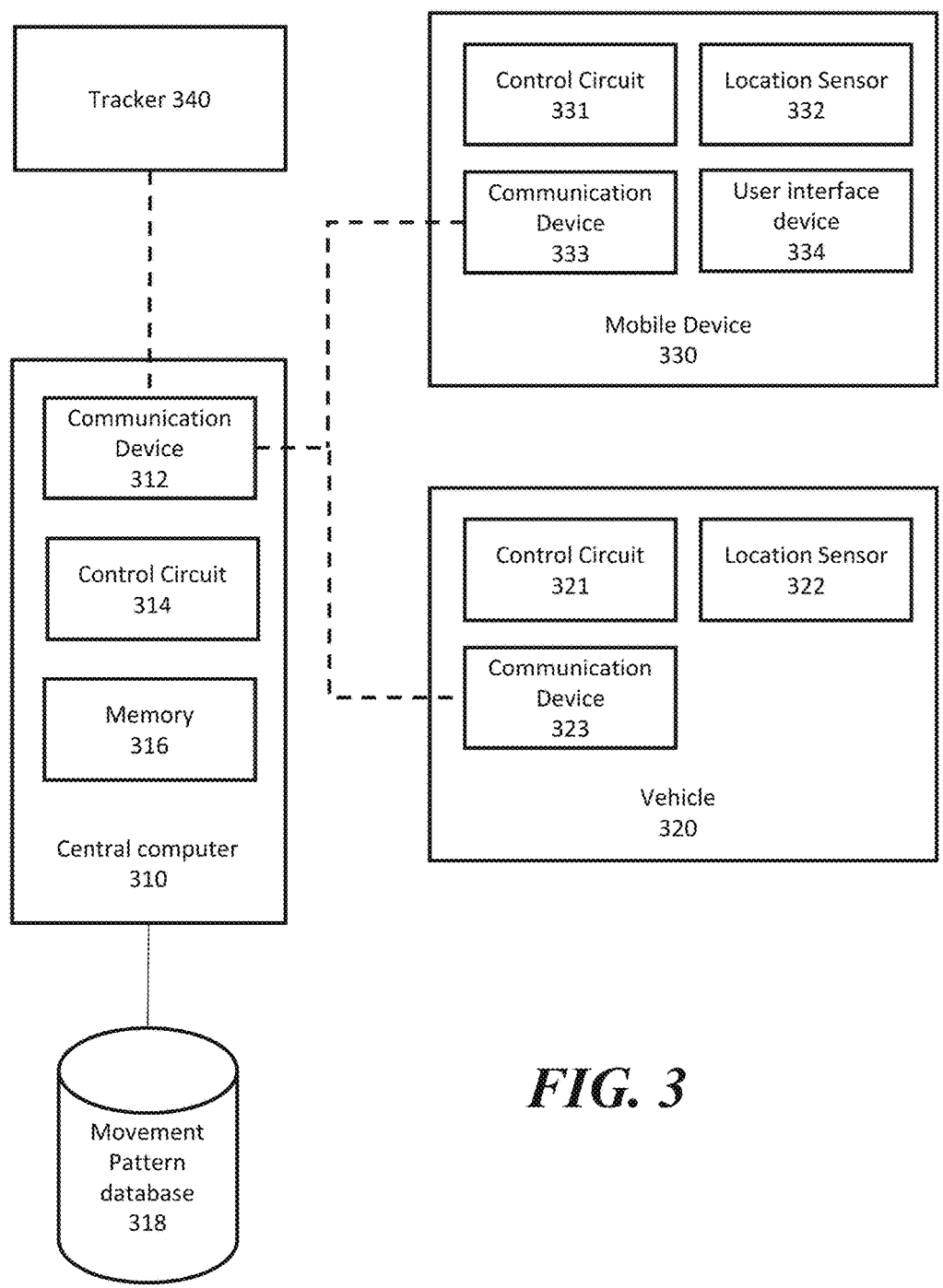
FIG. 3 is a block diagram of a system in accordance with several embodiments.

Referring now to FIG. 3, a block diagram of a system for providing reminders is shown. The system comprises a central computer system 310, a movement pattern database 318, a vehicle 320, a mobile device 330, and a tracker 340.

The central computer system 310 comprises a communication device 312, a control circuit 314, and a memory 316. The central computer system 310 may comprise one or more of a server, a central computing system, a cloud-based server, and the like. In some embodiments, the central computer system 310 may comprise the central computer system 110 described with reference to FIG. 1 herein or a similar device. In some embodiments, the central computer system 310 may comprise a system of two or more processor-based devices. The control circuit 314 may comprise a processor, a microprocessor, and the like and may be configured to execute computer readable instructions stored on a computer readable storage memory 316, The computer readable storage memory 316 may comprise volatile and/or non-volatile memory and have stored upon it a set of computer readable instructions which, when executed by the control circuit 314, causes the system to collect location information from the vehicle 320, the mobile device 330, and the tracker 340, and detect deviations between the current movement pattern of from the vehicle 320, the mobile device 330, and the tracker 340 and an expected movement pattern retrieved from the movement pattern database 318. In some embodiments, the computer executable instructions may cause the control circuit 314 of the central computer system 310 to perform one or more steps in the methods and processes described with reference to FIG. 2 herein.

The central computer system 310 may be coupled to a movement pattern database 318 via a wired and/or wireless communication channel. In some embodiments, the movement pattern database 318 may be at least partially implemented with the memory 316 of the central computer system 310. The movement pattern database 318 has stored upon it a plurality expected movement patterns. In some embodiments, the expected movement patterns in the movement pattern database 318 may be associated specific locations, specific users, location types, and/or user types. In some embodiments, expected movement patterns may be associated with different location types such as home, a workplace, a school, a park, etc. In some embodiments, the expected movement patterns stored in the movement pattern database 318 in the may further be associated with on one or more of a location type, a time of day, a day of the week, and a user demographic. For example, different expected movement patterns may be associated with the user's home in the morning when the user typically leaves their home and in the evening when the user typically returns. In some embodiments, the central computer system 310 may be configured to select expected movement patterns from the movement pattern database 318 based on user, user demographic, location, location type, item type, current time, current date, etc.

In some embodiments, movement patterns in the movement pattern database 318 may be determined based on movement histories of the vehicle, the mobile device, and the tracker aggregated over time. For example, the system may aggregate a plurality of movement patterns from the user and use the typical movement pattern associated with a location and/or time as the expected movement pattern. In some embodiments, expected movement patterns may be determined based on movement patterns associated with a plurality of sets of vehicles, mobile devices, and trackers associated with different users. For example, the movement patterns of users at a home, at a school, at a workplace, etc. may be grouped to form an expected movement pattern for these location types. In some embodiments, movement patterns associated with users may be grouped by the central computer system 310 based one or more of location type, time of day, day of the week, user location, user demographic, etc. to establish one or more expected movement patterns stored in the movement pattern database 318. In some embodiments, the expected movement pattern may comprise one or more expected locations for the vehicle, the mobile device, and the tracker. For example, an expected movement pattern associated with a home location in the evening may indicate that the mobile device and the tracker coupled to a grocery container should leave the vehicle together and enter the home. In another example, the expected movement pattern associated with a school location in the afternoon may indicate that a tracker associated with a child's lunch box should travel away from the school location with the vehicle and the mobile device. In yet another example, on a weekday morning, a tracker device worn on a child would be expected to leave the vehicle at a school location. In some embodiments, the system does not need to know what items are coupled to the tracker but may establish an expected movement pattern based on a history of movement patterns. In some embodiments, the system may be configured to determine an item type associated with the item coupled to the tracker based on tracking the movement pattern of the tracker over time. For example, if the tracker is observed to leave the vehicle at a school location, the system may identify the item coupled to the tracker as an item belonging to a child. In some embodiments, the system may select expected movement patterns based on item type and/or location type without a prior movement pattern history from the user. For example, an item belonging a child may be expected to be left in the vehicle at a workplace. In some embodiments, the expected movement pattern may comprise a movement pattern configured by a user. In some embodiments, expected movement patterns in the movement pattern database 318 may comprise expected locations of the vehicle, the mobile device, and the tracker over time. In some embodiments, the expected movement patterns may comprise expected distances between two or more of the vehicle, the mobile device, and the tracker over time. In some embodiments, the movement pattern may comprise distances between a location (e.g. user home, user workplace, school, etc.) and one or more of the vehicle, the mobile device, and the tracker.

The vehicle 320 may comprise a transport configured to carry humans and/or items to and from various destinations. In some embodiments, the vehicle 320 may comprise the vehicle 120 described with reference to FIG. 1 herein or a similar device. In some embodiments, the vehicle 320 may comprise a manned or unmanned vehicle. The vehicle comprises a control circuit 321, a location sensor 322, and the communication device 323.

The control circuit 321 may comprise a processor, a microprocessor, and the like and may be configured to execute computer readable instructions stored on a computer readable storage memory (not shown). The computer readable storage memory may comprise volatile and/or non-volatile memory and have stored upon it a set of computer readable instructions which, when executed by the control circuit 321, causes the system to collect send location information detected by the location sensor 322 to the central computer system 310. In some embodiments, the control circuit 321 may comprise the control circuit of the telemetric and/or control system of the vehicle. In some embodiments, the control circuit 321 may comprise the control circuit of a separately attached device.

In some embodiments, the location sensor 322 may comprise one or more of a Global Positioning System (GPS) sensor, a mobile data transceiver, a cellular network transceiver, a Wi-Fi transceiver, etc. configured to detect a location of the vehicle 320. The communication device 323 may comprise a wireless communication device configured to communicate with the central computer system 310. In some embodiments, the communication device 323 may comprise one or more of a mobile data transceiver, a cellular network transceiver, a Wi-Fi transceiver, and the like. In some embodiments, the vehicle 320 may further comprise a short-range sensor configured to detect for the presence and/or proximity of the mobile device 330 and/or the tracker 340. In some embodiments, the short range sensor may comprise one or more of a Bluetooth transceiver, a Wi-Fi transceiver, a Radio Frequency Identification (RFID) reader, and the like. In some embodiments, one or more of the control circuit 321, the location sensor 322, and/or the communication device 323 may comprise native components of the vehicle 320 and/or a separate device attached and/or retrofitted to the vehicle 320. In some embodiments, the control circuit 331 may comprise the control circuit of an appliance installed in the vehicle 320. In some embodiments, the vehicle 320 may be configured to communicate with a smart container in the vehicle 320. In some embodiments, the vehicle 320 may be configured use its power source (e.g. battery, fuel) to regulate the temperature of its interior and/or the interior of a container in the vehicle while a driver is not in the vehicle. In some embodiments, the vehicle may comprise other components typical of a vehicle system such as telemetric system, engine, wheel, vehicle controls, temperature control system, entertainment system, etc. In some embodiments, the vehicle 320 may be configured to provide an audio and/or visual alert based on messages received from the central computer system. In some embodiments, the audio and/or visual alerts may be provided via the built-in displays and/or speakers of the vehicle.

The mobile device 330 may comprise a processor-based portable device configured to be carried by a user. In some embodiments, the mobile device 330 may comprise one or more of a mobile phone, a smartphone, a tablet device, a watch, a head mounted display, a wearable device, and the like. In some embodiments, the mobile device 330 may comprise the mobile device 130 described with reference to FIG. 1 herein or a similar device. The mobile device 330 comprises a control circuit 331, a location sensor 332, a communication device 333, and a user interface device 334.

The control circuit 331 may comprise a processor, a microprocessor, and the like and may be configured to execute computer readable instructions stored on a computer readable storage memory (not shown). The computer readable storage memory may comprise volatile and/or non-volatile memory and have stored upon it a set of computer readable instructions which, when executed by the control circuit 331, causes the system to collect and send location information detected by the location sensor 332 to the central computer system 310. In some embodiments, the control circuit 331 may further be configured to generate an alert through the user interface device 334 based on messages received from the central computer system 310. In some embodiments, the control circuit 331 may be configured to execute a mobile application on the mobile device 330 and the alert may be provided via the mobile application. In some embodiments, the mobile application and/or a website may be provided to the user to enroll in the reminder service, register vehicles, devices, and/or tracker, and configure various setting associated with the reminder service.

The location sensor 332 may comprise a device configured to detect a location of the mobile device 330. In some embodiments, the location sensor 332 may comprise one or more of a Global Positioning System (GPS) sensor, a mobile data transceiver, a cellular network transceiver, a Wi-Fi transceiver, etc. configured to. The communication device 333 may comprise a wireless communication device configured to communicate with the central computer system 310 wirelessly. In some embodiments, the communication device 323 may comprise one or more of a mobile data transceiver, a cellular network transceiver, a Wi-Fi transceiver, and the like. In user interface device 334 may comprise user input/output devices such as a display screen, a speaker, a touch screen, one or more buttons, a microphone, and the like. In some embodiments, the user interface device 334 may be configured to provide an alert based on messages received from the central computer system 310. In some embodiments, the user interface device 334 may be used to interact act with and input information into a mobile application for the reminder service. In some embodiments, the alert may comprise a text message, a messaging service message, a mobile application notification, a pop-up notification, a ring tone, a vibration, and the like. In some embodiments, the mobile device 330 may further comprise a short range sensor configured to detect for the presence and/or proximity of the vehicle 320 and/or the tracker 340. In some embodiments, the short range sensor may comprise one or more of a Bluetooth transceiver, a Wi-Fi transceiver, a Radio Frequency Identification (RFID) reader, and the like.

In some embodiments, the tracker 340 may comprise a portable device configured to couple to an item such as a container, a tote, a bag, a box, and the like. Generally, the tracker may be coupled to any type of item with a coupler such as an adhesive, a clip, a hook, a ring, a hook and loop fastener, and the like. In some embodiments, the tracker 340 may comprise the tracker 140 described with reference to FIG. 1 herein or a similar device. In some embodiments, the tracker 340 may comprise a location sensor such as a Global Positioning System (GPS) sensor, a mobile data transceiver, a cellular network transceiver, a Wi-Fi transceiver, etc. and a communication device configured to transmit the location of the tracker to one or more of the central computer system 310, the vehicle 320, and the mobile device 330. In some embodiments, the tracker 340 may comprise a radio frequency device configured to be detected by one or more remote devices such as a geofence sensor, the vehicle 320, and/or the mobile device 330. In some embodiments, the tracker may comprise a Radio Frequency identification (RFID) tag, a near field communication (NFC) tag, a passive transmitter, and the like. While FIG. 3 shows the tracker 340 communicating with the central computer system 310, in some embodiments, the location of tracker may be provided to the central computer system 110 via separate device configured to detect for the presence and/or proximity of the tracker. In some embodiments, the location of the tracker may be provided by one or more of a geofence sensor, a stationary transceiver (e.g. Wi-Fi router), a mobile device 330, and a vehicle 320. In some embodiments, the tracker may comprise a smart container holding one or more items. In some embodiments, the tracker 340 may comprise a content sensor for detecting the content of a container coupled to the container. In some embodiments, the content sensor may comprise one or more of a RFID reader, a barcode sensor, a camera, and a temperature sensor. In some embodiments, the container content information may be transmitted to the central computer system 310 and/or determined by the central computer system 310 based on purchase records. The central computer system 310 may determine whether to provide an alert and/or select from a plurality of alert types based on the content of the container.

In some embodiments, a smart container may be configured to communicate with the vehicle 320 and cause the vehicle 320 to power a temperature control system for the container.

While one of each of the vehicle 320, the mobile device 330, and the tracker 340 are shown in FIG. 3, in some embodiments, the central computer system 110 may be configured to communicate with a plurality of vehicles, mobile devices, and tracker devices associated one or more users. For example, one user may be associated with a plurality of tracker 340. In another example, a vehicle 320 may be associated with a plurality of users and mobile devices 330. In some embodiments, the central computer system 310 may further be configured to communication with stationary devices such as geofence sensors, Wi-Fi routers, and smart appliances to receive location information and/or provide alerts. In some embodiments, some or all functionalities of the central computer system 310 described herein may be implemented on one or more of the control circuit 331 of the mobile device 330, the control circuit 321 of the vehicle 320, and a control circuit of the tracker 340. For example, locations of the tracker 340 and vehicle 320 may be transmitted to the mobile device 330, and a mobile application on the mobile device 330 may be configured to generate alerts based on the steps shown in FIG. 2.

In one example use case of the systems and methods described herein, the system may be used for a parent who drives their child to school at about the same time each weekday. The child has a backpack or lunchbox with a smart tracker device. The system communicates with the smart tracker device and logs the time and location of the smart tracker device over time. The system monitors the position of the tracker, a smartphone, and the car for a period of days and makes inferences based on the observed patterns. For example, the system may record that the tracker, the smartphone, and the car travel from point "A" (home) each day at around 7:30 am. By 7:50 am all three item would arrive at point "B" (school). By 7:55 am, the tracker diverges from the shared path of the other devices. Later, at about 2:30 pm, the path of the tracker again converges with that of the smartphone and car. Finally, at 2:50 pm, the smartphone and the tracker depart from the car at point "A". After the system monitors this pattern for a few days, the system stores the pattern as the expected pattern associated with the time periods and locations.

In some embodiments, the system may trace the vectors (path taken over time) for each device to find which devices travel together. The devices may comprise smartphone(s), smartwatch(es), wearable(s), smart lunchbox(es), smart container(s) (cooler), and smart car(s). If the paths of the items do not converge or diverge at the appointed day/time/place, the system will issue an alert to the connected devices such as a car display screen, a smartphone, and a wearable display, etc.

In some embodiments, the system may convert the time series of locations data through a Fourier Transform into a frequency series. The compacted data set could be more easily managed and searched for patterns and pattern mismatches. In some embodiments, the patterns may be episodic (e.g. 10 or 15 minutes long) such as a pattern of driving to school or work or shopping. The system may search for previous episodes similar to the one happening now. Once found, the system may compare position/device data between the current and previous episodes. An alert may be generated when the episodes and the devices diverge. The Fourier data may then be stored locally on the smart devices for pattern matching in the frequency domain.

Figure 4:
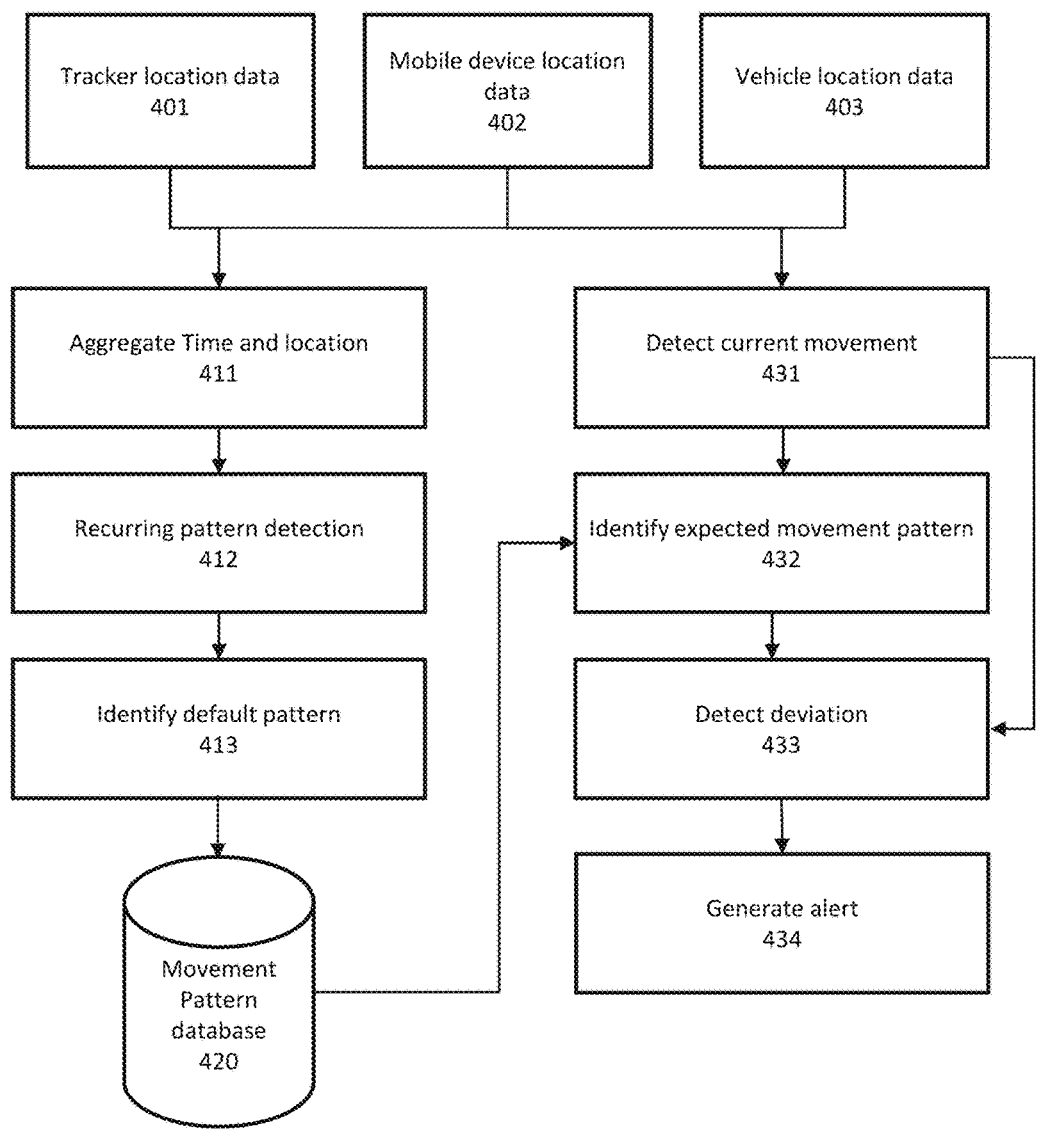
FIG. 4 is a flow diagram of a method in accordance with several embodiments.

Referring now to FIG. 4, a method of providing reminders is shown. In some embodiments, the steps shown in FIG. 4 may be performed by a processor-based device, such as a computer system, a server, a control circuit of a vehicle, a control circuit of a mobile device, a control circuit of a tracker device, and the like. In some embodiments, the steps in FIG. 4 may be performed by one or more of the central computer system 110 shown in FIG. 1, the control circuit 314, the control circuit 321, and/or the control circuit 331 described with reference to FIG. 3 herein or a similar device.

The system may continuously collect tracker location data 401, mobile device location data 402, and vehicle location data 403 over time. In step 411, the location data information of the various devices are aggregated into a database by time and location. In step 412, the system detects for recurring patterns in the data aggregated in step 411. In some embodiments, recurring patterns may be detected through vector analysis and/or Fourier transforms for frequency detection. In step 413, the system identifies default patterns. In some embodiments, default patterns comprise recurring patterns exceeding a threshold level of confidence. The level of confidence may be determined based on the number of times a pattern occurs, the time intervals between each occurrence, and the spatial and temporal similarities between each instance. Recurring patterns exceeding a confidence level threshold are stored into the movement pattern database 420 to be used to generate alerts.

In step 431, the system detects the current movement patterns of the tracker, the mobile device, and the vehicle. In step 432, the system selects a movement pattern from the movement pattern database 420 as the expected movement pattern. In some embodiments, the expected movement pattern may be identified based on the current date, time, and/or locations of one or more of the tracker, the mobile device, and the vehicle. In some embodiments, the expected movement pattern may be selected based on the degree of similarity between the expected movement pattern and the current movement pattern. For example, the expected movement pattern may be selected if the expected movement of at least two of the tracker, the mobile device, and vehicle conforms to the expected movement pattern. In step 433, the system detects any deviation from the movement pattern. For example, whether the distance between the tracker, the mobile, device, the vehicle, and/or a geographic location exceeds a distance threshold in the expected movement pattern. If a deviation is detected in step 433, the system generates an alert in step 434.

In some embodiments, the systems and methods described herein provide an alarm to remind customers to get groceries out of their car once they are home, especially if the items are perishable. In some embodiments, the system may know that a customer has shopped for or picked up groceries (including perishables) and provide the reminder accordingly. In some embodiments, a tracker may comprise a smart container that holds perishables in a car and wirelessly communicates with a mobile device and/or the vehicle while in the proximity of the mobile device and/or the vehicle. In some embodiments, the system may be configured to detect that a customer has crossed a geofence without a smart container and provide a message that alerts the customer that perishables appear to have been left in the car.

In one embodiment, a system for providing reminders comprises a communication device configured to receive location information associated with at least a vehicle, a mobile device, and a tracker coupled to an item, a movement pattern database, and a control circuit coupled to the communication device and the movement pattern database. The control circuit being configured to: track a current movement pattern of the vehicle, the mobile device, and the tracker based on the location information received via the communication device, select an expected movement pattern from the movement pattern database based on the location information associated with one or more of the vehicle, the mobile device, and the tracker, compare the current movement pattern of the vehicle, the mobile device, and the tracker with the expected movement pattern, and generate an alert based on detecting a deviation from the expected movement pattern.

In one embodiment, a method for providing reminders comprises: tracking, by a control circuit, a current movement pattern of a vehicle, a mobile device, and a tracker coupled to an item based on location information received via a communication device, selecting an expected movement pattern from a movement pattern database based on the location information associated with one or more of the vehicle, the mobile device, and the tracker, comparing the current movement pattern of the vehicle, the mobile device, and the tracker with the expected movement pattern, and generating an alert based on detecting a deviation from the expected movement pattern.

In one embodiment, an apparatus for providing reminders comprises a non-transitory storage medium storing a set of computer readable instructions and a control circuit configured to execute the set of computer readable instructions which causes to the control circuit to: track a current movement pattern of a vehicle, a mobile device, and a tracker coupled to an item based on location information received via a communication device, select an expected movement pattern from a movement pattern database based on the location information associated with one or more of the vehicle, the mobile device, the tracker, compare the current movement pattern of the vehicle, the mobile device, and the tracker with the expected movement pattern, and generate an alert based on detecting a deviation from the expected movement pattern.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for providing reminders based on tracking vehicle and device movements comprising:
   a communication device configured to receive location information associated with at least a vehicle, a mobile device, and a tracker coupled to an item,
   a movement pattern database; and
   a control circuit coupled to the communication device and the movement pattern database, the control circuit being configured to:
      track a current movement pattern of the vehicle, the mobile device, and the tracker based on the location information received via the communication device wherein the tracker is coupled to a container;
      select an expected movement pattern from the movement pattern database based on the location information associated with one or more of the vehicle, the mobile device, and the tracker;
      determine a content of the container based on a purchase record;

compare the current movement pattern of the vehicle, the mobile device, and the tracker with the expected movement pattern; and generate an alert based on detecting a deviation from the expected movement pattern and the content of the container determined based on the purchase record.

2. The system of claim 1, wherein the location information associated with one or more of the vehicle, the mobile device, and the tracker is determined based one or more of a GPS sensor, a geofence sensor, a Wi-Fi transceiver, and mobile network transceiver.

3. The system of claim 1, wherein the expected movement pattern is determined based on movement histories of the vehicle, the mobile device, and the tracker tracked over time.

4. The system of claim 1, wherein the expected movement pattern is determined based on movement patterns associated with a plurality of sets of vehicles, mobile devices, and trackers associated with different users.

5. The system of claim 1, wherein the expected movement pattern is selected further based on one or more of a location type, a time of day, a day of the week, and a user demographic.

6. The system of claim 1, wherein the control circuit is further configured to determine the content of the container based on a content sensor coupled to the container.

7. The system of claim 1, wherein the tracker is coupled to a container, and the control circuit is further configured to generate the alert based on whether a content of the container comprises one or more of: perishable items, refrigerated items, and frozen items.

8. The system of claim 1, wherein the alert is generated further based on whether the vehicle is powering a temperature control system for maintaining a temperature around the item.

9. The system of claim 1, wherein the control circuit is further configured to:
determine an item type associated with the item coupled to the tracker based on tracking a movement pattern of the tracker over time.

10. The system of claim 1, wherein the control circuit is further configured to:
select from a plurality of alert types based on one or more of: a duration of the deviation, a current temperature, a current time, and an item type associated with the tracker.

11. A method for providing reminders based on tracking vehicle and device movements comprising:
tracking, by a control circuit, a current movement pattern of a vehicle, a mobile device, and a tracker coupled to an item based on location information received via a communication device wherein the tracker is coupled to a container;
selecting an expected movement pattern from a movement pattern database based on the location information associated with one or more of the vehicle, the mobile device, and the tracker;
determine a content of the container based on a purchase record;
comparing the current movement pattern of the vehicle, the mobile device, and the tracker with the expected movement pattern; and
generating an alert based on detecting a deviation from the expected movement pattern and the content of the container determined based on the purchase record.

12. The method of claim 11, wherein the location information associated with one or more of the vehicle, the mobile device, and the tracker is determined based one or more of a GPS sensor, a geofence sensor, a Wi-Fi transceiver, and mobile network transceiver.

13. The method of claim 11, wherein the expected movement pattern is determined based on movement histories of the vehicle, the mobile device, and the tracker tracked over time.

14. The method of claim 11, wherein the expected movement pattern is determined based on movement patterns associated with a plurality of sets of vehicles, mobile devices, and trackers associated with different users.

15. The method of claim 11, wherein the expected movement pattern is selected further based on one or more of a location type, a time of day, a day of the week, and a user demographic.

16. The method of claim 11, wherein:
the content of the container is determined further based on a content sensor coupled to the container.

17. The method of claim 11, further comprising:
generating the alert based on whether a content of a container coupled to the tracker comprises one or more of: perishable items, refrigerated items, and frozen items.

18. The method of claim 11, wherein the alert is generated further based on whether the vehicle is powering a temperature control system for maintaining a temperature around the item.

19. The method of claim 11, further comprising:
determining an item type associated with the item coupled to the tracker based on tracking a movement pattern of the tracker over time; and
selecting from a plurality of alert types based on the item type associated with the item.

20. The method of claim 11, further comprising:
selecting from a plurality of alert types based on one or more of: a duration of the deviation, a current temperature, a current time, and an item type associated with the tracker.

21. An apparatus for providing reminders based on tracking vehicle and device movements comprising:
a non-transitory storage medium storing a set of computer readable instructions; and
a control circuit configured to execute the set of computer readable instructions which causes to the control circuit to:
track a current movement pattern of a vehicle, a mobile device, and a tracker coupled to an item based on location information received via a communication device wherein the tracker is coupled to a container;
select an expected movement pattern from a movement pattern database based on the location information associated with one or more of the vehicle, the mobile device, the tracker;
determine a content of the container based on a purchase record;
compare the current movement pattern of the vehicle, the mobile device, and the tracker with the expected movement pattern; and
generate an alert based on detecting a deviation from the expected movement pattern and the content of the container determined based on the purchase record.

* * * * *